United States Patent [19]

Barsotti et al.

[11] Patent Number: 5,466,752

[45] Date of Patent: Nov. 14, 1995

[54] NONCYCLIC ANHYDRIDE, EPOXY POLYMER AND CATALYTIC MACROMONOMER-GRAFTED ACRYLIC COPOLYMER

[75] Inventors: Robert J. Barsotti, Franklinville, N.J.; Charles T. Berge; Christopher Scopazzi, both of Wilmington, Del.

[73] Assignee: E. I. du Pont de Nemours and Company, Wilmington, Del.

[21] Appl. No.: 382,116

[22] Filed: Feb. 1, 1995

Related U.S. Application Data

[62] Division of Ser. No. 272,342, Jul. 8, 1994, Pat. No. 5,412,039.

[51] Int. Cl.[6] .......................... C08F 265/02; C08L 33/14; C08L 67/00
[52] U.S. Cl. .............................. 525/65; 525/309; 524/315
[58] Field of Search ....................... 525/65, 309; 524/315

[56] References Cited

U.S. PATENT DOCUMENTS

| | | | |
|---|---|---|---|
| 4,908,397 | 3/1990 | Barsotti et al. | 523/437 |
| 5,010,140 | 4/1991 | Antonelli et al. | 525/309 |
| 5,017,435 | 5/1991 | Barsotti et al. | 525/114 |
| 5,310,813 | 5/1994 | Nagasawa et al. | 525/309 |

FOREIGN PATENT DOCUMENTS

WO94/11415  5/1994  WIPO.

OTHER PUBLICATIONS

Chemical abstract No. 119:252243 for PCT publication No. WO9311188, Jun. 10, 1993, Kansai Paint Co.

Chemical Abstract No., 120:273208 for Japanese Patent No. 5-295236, Nov. 9, 1993, Kansai Paint Co.

*Primary Examiner*—Robert E. Sellers

[57] ABSTRACT

A coating composition contains an organic solvent, a binder composed of an anhydride resin with more than one noncyclic anhydride moiety and an epoxy resin derived from an epoxy-containing unsaturated monomer, and a catalyst wherein a catalyst is reacted with the core of a branched acrylic copolymer formed from at least about 5% by weight of an acid-functional unsaturated monomer, and grafted to the core, one end of a macromolecular acrylic stabilizer soluble in an organic solvent.

8 Claims, No Drawings

NONCYCLIC ANHYDRIDE, EPOXY POLYMER AND CATALYTIC MACROMONOMER-GRAFTED ACRYLIC COPOLYMER

This is a division of application Ser. No. 08/272,342, filed Jul. 8, 1994, now U.S. Pat. No. 5,412,039.

BACKGROUND OF THE INVENTION

The present invention relates to solvent reversible dispersion (SRD) catalytic compositions and curable coating compositions particularly useful as a top coat in multi-layered coating systems.

Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coatings had suggested the use of anhydride resins having pendant non-cyclic anhydride moieties in combination with resins that react with the polyanhydride resins to cure under curing conditions. However, a continuing need exists for coating formulations which provide both stability before application to a substrate and outstanding performance characteristics after application, and particularly resistance to environmental etching.

SUMMARY OF THE INVENTION

The present invention provides an SRD catalyst which can be used in a stable, sprayable coating composition.

Specifically, the instant invention provides catalytic composition comprising a catalyst which is chemically bound to a core of acrylic polymer which is substantially non-soluble in non-polar organic solvent and, grafted to the core, a plurality of substantially linear stabilizer components having an acrylic backbone, each of which is soluble in organic solvent and has one end of the stabilizer molecule grafted to the core.

The present invention further provides a curable, sprayable, coating composition comprising organic solvent and binder, the binder comprising:

(a) an anhydride resin having a molecular weight of less than about 3,000 that contains (1) a central moiety, and (2) on average, more than one pendant, non-cyclic anhydride moiety bonded to each central moiety;

(b) a coreactant polymeric resin having a molecular weight of about from 1,000 to 20,000 and comprising at least about 30 wt % of copolymerized ethylenically unsaturated monomer containing at least one epoxy moiety; and (c) a functional amount of at least one catalytic composition as defined above, wherein the ratio of equivalents of epoxy to anhydride is about from 0.5 to 1.8.

DETAILED DESCRIPTION OF THE INVENTION

The coating compositions of the present invention comprise an anhydride resin, a co-reactant epoxy resin, and a latent catalyst, each as described below.

Anhydride resins which can be used in the present invention include those having a molecular weight of less than about 3000 having a central moiety and more than one pendant, non-cyclic anhydride moiety bonded to each central moiety. The anhydride is asymmetrical, and preferably contains a moiety represented by the following formula:

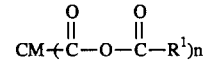

wherein (CM) is a central moiety, ($R^1$) is an organic moiety, and n is a number of pendant anhydride groups that averages greater than one.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multi functional alcohols such as pentaerythritol, trimethylolpropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1000.

Each anhydride moiety is typically terminated by an organic group ($R^1$). This group is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

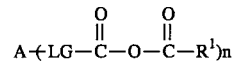

The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so tidal the anhydride is represented by the formula:

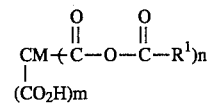

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin should be less than about 3000. At molecular weights of the oligomeric anhydride greater than 3000, it is difficult to attain a sprayable composition with a volatile organic content of less than about 3.8 pounds of organic solvent per gallon of curable compositions. The molecular weight of the anhydride resin is preferably less than about 2000, and especially about from 400 to 1,000, and the anhydride resin preferably has 3 to 4 pendant, non-cyclic anhydride moieties bonded to each central moiety.

A second component of the present formulation is a polymeric epoxy resin. An important feature of the epoxy resins used in the present invention is that the resin comprise at least about 30 wt % copolymerized ethylenically unsaturated monomer containing an epoxy group and have a molecular weight of about from 1,000 to 20,000. The epoxy resin can further comprise copolymerized monomers of alkyl methacrylates, or alkyl acrylates or mixtures thereof, where the alkyl groups have 1–12 carton atoms. Optionally, the acrylic polymer can contain other components such as styrene, alphamethyl styrene, acrylonitrile, methacrylonitrile in amounts of about 0.1–50% by weight.

Typical alkyl acrylates and methacrylates that can be used to form the acrylic polymer are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylic polymer are acrylamide, methacrylamide, acrylo alkoxy silanes such as gamma methacrylyl propyl trimethoxy silane.

The relative concentrations of the anhydride resin and the epoxy resin can vary widely. However, the ratio of equivalents of epoxy to anhydride should be about from 0.5 to 1.8.

The compositions of the present invention further comprise at least one SRD catalyst. In the context of the present invention, SRD catalyst is understood to mean a catalyst which is chemically bound or associated with the acrylic core or insoluble phase of the composition. The core material is selected to be insoluble in the coating composition. However, upon application of coating composition, with attendant removal of the solvent or the application of heat, the core of the aqueous dispersion dissolves and makes the catalyst available to promote the crosslinking reaction between the epoxy and anhydride components. While a wide variety of such catalysts can be used, as will be evident to those skilled in the art, those found to be particularly satisfactory in the present invention include onium compounds such as phosphonium and ammonium.

In the preparation of the SRD catalyst, a branched copolymer is first prepared which is soluble in the polymerizing solvent medium. The branched copolymer is prepared by copolymerizing, preferably by free radical copolymerization, a backbone monomer with macromonomer. At least about 5 wt % of the backbone monomer contains acid functionality. The backbone is substantially free from monomer groups that will react with the acid functionality. The acid functionality of the resulting product is then reacted with the appropriate catalyst. For example, the acid is neutralized with potassium hydroxide and then further reacted with tetrabutylphosphonium chloride. The phosphonium will replace the potassium moieties on the polymer and result in a polymer bound catalyst. The resulting potassium chloride precipitant can be later filtered from the system.

After completion of the reaction, the solvent can be, and preferably is, stripped from the reaction mixture and excess solvent is then added to the polymer product, which solvent is not a solvent for the backbone polymer, but which is a solvent for the macromonomer. The addition of this non-solvent results in a dispersion. The dispersed phase in the dispersion is the insoluble backbone polymer in which the macromonomer provides a stabilizing function.

The branched copolymer used in the present invention has a weight average molecular weight of about from 10,000 to 100,000, preferably about from 15,000 to 50,000. All molecular weights disclosed herein are determined by gel permeation chromatography using a polystyrene standard.

The branched copolymer can be prepared by polymerizing ethylenically unsaturated monomers in the presence of macromonomers each having a terminal ethylene unsaturation for grafting. The resulting polymer can be represented as being composed of a backbone having a plurality of macromonomer "arms" attached thereto.

In a preferred process of preparing the branched copolymers used in the present invention, cobalt chain transfer is used in the first step of a two step process. This first step typically involves polymerizing, in an inert organic solvent, a mixture of ethylenically unsaturated monomers using a catalytic chain transfer agent, preferably containing $Co^{-2}$ or $Co^{+3}$, to obtain macromonomers.

As indicated above, the preferred catalytic chain transfer agent is a compound which contains $Co^{-2}$ or $Co^{+3}$. Exemplary cobalt chelates are those described in U.S. Pat. No. 4,680,352 to Janowicz et al. and U.S. Pat. No. 4,722,984 to Janowicz, hereby incorporated by reference in their entirety. Most preferred chelates are pentacyanocobaltate (II), diaquabis(borondifluorodimethylglyoximato) cobaltate (II) and diaquabis(borondifluorodiphenylglyoximato) cobaltate (II). Co+3 catalysts are described in PCT Patent Application WO87/03605, also hereby incorporated by reference. Such chain transfer agents are ordinarily used at concentrations of 5–150 ppm based on the monomers.

Typically, a mixture of monomers and organic liquid is heated, preferably to reflux temperature for ease of control, and to tile mixture is added the catalytic chain transfer agent of choice, additional monomers and solvent, and the usual amount of a conventional polymerization initiator such as an azo- or peroxide initiator. The reaction is run, with additions of monomers and initiator as needed, until the desired macromonomers are obtained having the desired molecular weight. In general, these molecular weights (Mw) are about from 2,000 to 30,000 and preferably about from 3,000–10,000. Solvents which can be used are aromatic and aliphatic hydrocarbons, esters, ketones and mixtures thereof.

The second step in the preferred process of preparing the branched copolymer involves forming a polymeric backbone by polymerizing, in an organic solvent, in tile presence of said previously prepared macromonomers, another mixture of ethylenically unsaturated monomers comprising 5 to 75 percent, preferably 15 to 40 percent, based on the weight of the backbone, of polymerizable ethylenically unsaturated monomers containing acid functionality such as methacrylic or acrylic acid This polymerization, whereby tile backbone of the branched polymer is formed, may employ any free radical or vinyl addition polymerization reaction process, and does not necessarily require a chain transfer agent. A typical vinyl addition polymerization reaction is usually conducted at a temperature within the range of about 80° C. to about 160° C., preferably 90° C. to 130° C.

The monomer make-up of the macromonomers and the backbone need not be the same, and in fact diverse properties such as Tg's may be desirable. It may be desirable to have higher amounts of styrene in the backbone.

During polymerization of the backbone, there is generally present a free radical initiator which is selected from a wide variety of materials. Suitable types of materials include peroxides, hydroperoxides and azo initiators. Examples of these types of initiators include di-tertiarybutyl peroxide, di-cumylperoxide; amyl peroxyacetate; cumenehydroperoxide; 2,5-dimethyl-2,5-bis(tertiarybutylperoxy) hexane; hexyne-3-tertiarybutyl cumylperoxide; tertiaryamyl peroxide; 2,5-dihydroperoxy-2,5-dimethyl hexane, di (n-propyl) peroxydicarbonate and 2,2'-azobis (2,4-dimethyl-4-methoxyvaleronitrile).

The amount of initiator can vary widely, although usually it is present in an amount ranging from about 3 percent to about 8 percent, the percentage based on the total weight of the vinyl monomer component. Generally, there is also present during the vinyl addition polymerization a solvent which assists in maintaining the preferred reaction temperature. Typical solvents and diluents include toluene, xylene, butyl acetate, acetone, methyl isobutyl ketone, methyl ethyl ketone, ethyl amyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, aromatic petroleum distillates, esters, ethers and ketones, and the like.

This branched copolymer can further comprise copolymerized monomers of alkyl methacrylates, or alkyl acrylates or mixtures thereof, where the alkyl groups have 1–12 carton atoms. Optionally, the acrylic polymer can contain other components such as styrene, alphamethyl styrene, acrylonitrile, methacrylonitrile in amounts of about 0.1–50% by weight.

Typical alkyl acrylates and methacrylates that can be used to form the branched acrylic polymer are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylic polymer are acrylamide and methacrylamide.

A functional amount of SRD catalyst is used in the present formulations, and will vary widely, depending on the specific anhydride resin and epoxy resin selected, as well as their molecular weight and relative proportions. While the specific concentration of the SRD catalyst will be selected in view of these variables, as evident to those skilled in the art, the quantities will generally be about from 0.1 to 7 wt %, based on the weight of the solids in the formulation. The solvent composition of the clearcoat formulation is selected to maintain the SRD dispersed so that the catalysts does not interfere with tile clarity of the composition. The concentration of the catalysts within the catalytic composition will similarly vary substantially with the particular components selected. However, in general, the catalysts will represent about from 0.5 to 30%, a preferably 5 to 15% by weight of the catalytic composition.

In the function of the SRD catalysts, the core material, which is substantially non-soluble in non-polar organic solvents such as aliphatic hydrocarbons, maintains the catalysts out of contact with the reactants in the coating formulation. However, upon removal of the non-polar solvents, for example, with the application of the coating to a substrate or heating, and the surrounding of the core material in an excess of polar solvent in which the core material is soluble, the catalysts becomes available to promote tile reaction between the anhydride and epoxy components in the coating composition.

The coating compositions of the present invention are formulated into high solids coating systems with at least one solvent. The solvent is usually organic, and, in combination with the other components of the coating composition, is a non-solvent for the core material in the catalyst. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

In the preparation and storage of the compositions of the present invention, to provide for long term stability, compounds containing active hydrogen should be minimized, such as alcohols or water.

The coating compositions of tile present invention can also contain conventional additives such as pigments, stabilizers, theology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The compositions of the present invention generally have a volatile organic content of less than about 3.8 pounds of organic solvent per gallon of curable composition, that is, at least about 50 wt % solids. In addition, the present coating compositions are stable at ambient conditions for a period of up to about four weeks. This permits the preparation of a complete coating composition under ideal formulation conditions, shipment and use of the coating composition within the two week period without further modification or blending that would be required if the components needed to be maintained apart prior to application to a substrate. The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried water borne basecoats. The ability to apply the present compositions by spraying techniques with the unusually low VOC content is particularly surprizing for a one package epoxy coating formulation.

After application to a substrate, the present compositions are cured by heating to a temperature of about from 120° to 140° C. for a period of about from 15 to 90 minutes.

The performance characteristics of the final cured coating composition are excellent, providing a combination of excellent gloss and durability to abrasion, sunlight and acidic rain. At the same time, the compositions provide case of handling, resulting from all the components being present in a single formulation, good shelf life and low volatile organic content.

The present invention is further illustrated by the following specific examples, in which parts and percentages are by weight unless otherwise indicated. Molecular weight, as used herein, refers to weight average molecular weight, as determined by gas phase chromatography.

EXAMPLES 1–3

In Examples 1–3, SRD catalysts were prepared, and curable coating compositions were prepared from an anhydride resin, co-reactant polymeric epoxy resin and the SRD catalysts.

(a) SRD Catalyst

Preparation of Macromonomer

To a 2-liter flask fitted with an agitator, condenser, heating mantle, nitrogen inlet, thermocouple and an addition port was added 406.5 gms. butyl methacrylate, 100 gms butyl acetate and 160 gms toluene. The mixture was agitated and heated to reflux (122°–135° C.) under nitrogen. To this was then added, in one portion, a pre-mix of a solution of 0.35 gms. Vazo® 88, 13.8 gms. toluene and 17.2 gms. of a 0.17% solution of bis(Boron Difluoro Diphenyl Glyoximate) Cobaltate (II) in methyl ethyl ketone. This was followed by the addition of a pre-mix of a solution of 356.7 gms. butyl methacrylate, 1.35 gms. Vazo® 88 and 86.6 gms. toluene over 240 minutes while maintaining reflux (116°–122° C.). Following a 30 minute hold period, a pre-mixed solution of 0.32 gms. Vazo® 88 and 23 gms. toluene was added over 60 minutes, while maintaining reflux. The batch was then held at reflux for an additional 60 minutes, at which time a solution of 0.23 gms. t-butyl peroctoate and 31.39 gms. butyl acetate was added and the reaction mixture then cooled. The macromonomer thus prepared has a number average molecular weight of 4800 and a weight average molecular weight of 7739 as determined by GPC. Weight solids are 63.6% and Gardner viscosity G. The percent terminal vinyl unsaturation is >95 as determined by thermogravimetric analysis.

Preparation of Branched Polymer

To a 5-liter flask fitted with an agitator, condenser, heating mantle, nitrogen inlet, thermocouple and an addition port was added 389.7 gms. of macromonomer prepared above, and 82.31 gms. of butyl acetate and the temperature raised to 100° C. under nitrogen. To this was added a premixed solution of 99.7 gms. methyl methacrylate, 49.9 gms. methacrylic acid, 49.9 gms. styrene, 49.9 gms. butyl acrylate, 6.24 gms. Vazo® 88, 40.0 gms. butyl acetate and 32.4 gms. methyl ethyl ketone over 180 minutes holding the temperature at 100° C. Following a 60 minute hold period, the temperature was lowered to 90° C. over 30 minutes and the batch held at this temperature for 270 minutes, after which the batch was cooled. Molecular weight via gel permeation chromatography was found to be 28000 weight average. Weight solids were 63%.

Preparation of Solvent Responsive Dispersion of Tetra-Butyl Phosphonium Chloride/Acid Complex To a 2-liter flask fitted with an agitator, condenser, heating mantle, nitrogen inlet, thermocouple and an addition port was added 400 gms. of branched polymer from Example 2 and 20.4 gms. of a 40% solution of KOH in methanol. The mixture was agitated and heated to 70° C. where it was held for 30 minutes. To the batch was then added 170.5 gms. of a 25% solution of tetra-butyl phosphonium chloride in PM acetate® over 15 minutes, with agitation at which the temperature was raised to distill 206 gms. of solvent. Following distillation a non-aqueous dispersion was formed by the addition of 561.2 gms. of heptane for a final weight solids of 45%.

Two catalyst formulations were prepared using the resulting SRD catalyst.

| SRD Catalyst Formulation #1 | |
| --- | --- |
| SRD Catalyst | 31.8 |
| Aliphatic VM & P NAP (100–150 C.) | 27.4 |

The components were mixed, allowed to stand for 4 hours, and filtered to remove precipitate.

| SRD Catalyst Formulation #2 | |
| --- | --- |
| SRD Catalyst | 40.5 |
| VM & P NAP (100–150 C.) | 34.5 |
| 5% XU-71950 in Xylene (diglycidyl ester from Dow of 1,2-cyclohexane dicarboxylic acid) | 3.8 |

The mixture was aged at 120° F. for 3 days, and filtered to remove precipitate.

(b) Anhydride Resin

An anhydride resin was prepared from a tetra-functional half-acid ester. The following constituents were charged to a reaction vessel equipped with a heating mantle, reflux condenser, thermometer, nitrogen inlet, and stirrer:

| | Parts by Weight |
| --- | --- |
| Portion 1 | |
| Pentaerythritol | 478.0 |
| Methyl hexahydrophthalic anhydride | 2250.0 |
| Triethylamine | 0.5 |
| Portion 2 | |
| Xylol (135–145° C.) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was charged into a 5L flask equipped with a stirrer and a gas inlet tube. The gas inlet tube was attached to a ketene generator substantially the same as the one described by Williams et al. in the Journal of Organic Chemistry 5, 122, 1940. Ketene is bubbled through the solution until all of the acid groups have been converted to anhydride groups. Reaction progress is monitored via FTIR. Solvent was then removed under vacuum to give a linear pendant anhydride with the following characteristics:

% weight solids: 78.0

Anhydride eq. wt.: 329+/−4 (on solution basis)

Acid eq. wt.: 6176+/−1323 (on solution basis)

(c) Epoxy Polymer

The epoxy resin was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135–145 C.) | 177.5 |
| Aromatic Hydrocarbon (155–177 C.) | 1193.2 |
| Portion 2 | |
| Glycidyl methacrylate | 868.0 |
| Butyl methacrylate | 651.0 |
| Butyl acrylate | 325.5 |
| Styrene | 325.5 |
| Aromatic Hydrocarbon (155–177 C.) | 85.0 |
| Portion 3 | |
| t-butylperoxyacetate (75% in Mineral Spirits) | 90.2 |
| Aromatic Hydrocarbon (155–177 C.) | 319.8 |
| TOTAL | 4035.7 |

Portion 1 was charged into the polymerization vessel and heated to reflux under nitrogen. Portion 2 was then added to the vessel over 180 minutes and Portion 3 over 210 minutes. After addition of Portion 3, the reaction mixture was held at reflux for an additional 30 minutes and then 845.5 of solvent removed by distillation. The resulting polymer solution had the following characteristics:

% weight solids: 70.0

Mn of polymer=849

Mw of polymer=2040

(d) Coating Compositions

Coating compositions were prepared from the linear pendant anhydride, the GMA polymer and SRD catalyst, together with conventional additives, according to the following formulations:

| EXAMPLE | 1 | 2 | 3 |
|---|---|---|---|
| Linear Pendant Anhydride | 78.12 | 78.12 | 78.12 |
| 40% GMA Polymer | 141.87 | 141.87 | 141.87 |
| SRD Catalyst Formulation #1 | 9.8 | 0 | 9.8 |
| SRD Catalyst Formulation #2 | 0 | 9.8 | 0 |
| Butyl Acetate | 17 | 17 | 17 |
| Tinuvin 384 (UV Screener-Ciba) | 0 | 0 | 3.2 |
| Tinuvin 123 (Hals-Ciba) | 0 | 0 | 2.4 |
| 50% Dislon L-1984 Flow Add in Xylene (King Ind.) | 0 | 0 | 0.7 |

In each of the Examples, the coating, cured at 285° F., exhibited excellent appearance, durability and etch resistance.

The coating compositions of Examples 1 and 2 were compared with a similar coating composition catalyzed by unbound tetrabutylphosphonium chloride instead of the catalyst formulations used in Examples 1 and 2. The amount of catalyst used in the coatings, was the amount needed to obtain good cure in the final coating, which was cured for 30 minutes at 285° F. The viscosity stability of these coatings, upon aging at 110° F., were measured in seconds, using a Fisher #2 viscosity cup. The test results are shown below, and show the excellent stability using the SRD catalyst formulations compared to the unbound phosphonium catalyst.

TABLE

| VISCOSITY (F#2 IN SEC) | | | |
|---|---|---|---|
| | TETRABUTYL PHOSPHONIUM CATALYST | SRD#1 | SRD#2 |
| INITIAL | 35 | 35 | 35 |
| 3 DAYS | 52 | 49 | 47 |
| 7 DAYS | 150 | 89 | 82 |
| 10 DAYS | 300+ | 106 | 99 |
| 14 DAYS | GEL | 201 | 223 |

We claim:

1. A sprayable, curable, coating composition comprising organic solvent and binder, the binder comprising:

(a) anhydride resin having a molecular weight of less than about 3,000 that contains (1) a central moiety, and (2) on average, more than one pendant, non-cyclic anhydride moiety bonded to each central moiety;

(b) coreactant polymeric resin having a molecular weight of about from 1,000 to 20,000 and comprising at least about 30% by weight of copolymerized ethylenically unsaturated monomer containing at least one epoxy moiety; and (c) at least one catalytic composition comprising a catalyst reacted with the acid functionality of a core of a branched acrylic copolymer which is insoluble in a non-polar organic solvent and formed from the polymerization of an ethylenically unsaturated monomer with at least about 5% by weight of acid functionality, and grafted to the core, one end of an acrylic stabilizer in the form of a macromonomer, said acrylic stabilizer being soluble in an organic solvent, wherein the ratio of equivalents of epoxy to anhydride is about from 0.5 to 1.8:1.

2. A composition of claim 1 wherein the anhydride resin has a molecular weight of about from 400 to 1000.

3. A composition of claim 2 wherein the anhydride resin has from 3 to 4 pendant, non-cyclic anhydride moieties bonded to each central moiety.

4. A composition of claim 3 wherein the anhydride resin consists essentially of the reaction product of pentaerythritol, a methyl hexahydrophthalic anhydride and ketene.

5. A composition of claim 1 wherein the coreactant resin has a molecular weight of about from 3,000 to 8,000.

6. A composition of claim 5 wherein the coreactant resin comprises at least about 40% glycidyl methacrylate.

7. A composition of claim 1 wherein the coreactant polymeric resin is linear.

8. A curable coating composition of claim 1 further comprising about from 1 to 200 parts by weight, per 100 parts of components (a) and (b), of pigment.

* * * * *